United States Patent
Bhan et al.

(10) Patent No.: US 11,498,060 B2
(45) Date of Patent: Nov. 15, 2022

(54) ULTRA-STABLE HEAVY HYDROCARBON HYDROPROCESSING CATALYST AND METHODS OF MAKING AND USE THEREOF

(71) Applicant: SHELL OIL COMPANY, Houston, TX (US)

(72) Inventors: Opinder Kishan Bhan, Katy, TX (US); David Andrew Komar, Winfield, PA (US)

(73) Assignee: SHELL USA, INC., Houston, TX (US)

( * ) Notice: Subject to any disclaimer, the term of this patent is extended or adjusted under 35 U.S.C. 154(b) by 344 days.

(21) Appl. No.: 16/793,254

(22) Filed: Feb. 18, 2020

(65) Prior Publication Data
US 2020/0179911 A1   Jun. 11, 2020

Related U.S. Application Data

(62) Division of application No. 14/514,814, filed on Oct. 15, 2014, now Pat. No. 10,603,656.
(Continued)

(51) Int. Cl.
| | |
|---|---|
| *B01J 27/19* | (2006.01) |
| *B01J 35/10* | (2006.01) |
| *B01J 37/04* | (2006.01) |
| *B01J 37/00* | (2006.01) |
| *C10G 45/08* | (2006.01) |

(52) U.S. Cl.
CPC ............ *B01J 27/19* (2013.01); *B01J 35/108* (2013.01); *B01J 37/0009* (2013.01); *B01J 37/04* (2013.01); *C10G 45/08* (2013.01)

(58) Field of Classification Search
CPC .......... B01J 27/19; B01J 35/108; C01G 45/08
See application file for complete search history.

(56) References Cited

U.S. PATENT DOCUMENTS

| | | | |
|---|---|---|---|
| 3,897,365 A | 7/1975 | Feins et al. | |
| 4,402,865 A | 9/1983 | Blakely | |
| (Continued) | | | |

FOREIGN PATENT DOCUMENTS

| | | | | |
|---|---|---|---|---|
| CA | 2866425 A1 * | 10/2013 | ............. | B01J 23/85 |
| EP | 0342759 A1 | 11/1989 | | |
| (Continued) | | | | |

OTHER PUBLICATIONS

Shariat et al., "Optimizing Conditions for Hydrometallurgical Production of Purified Molybdenum Trioxide From Roasted Molybdenite of Sarcheshmeh", Minerals Engineering, vol. 14, Issue No. 7, Jul. 2001, pp. 815-820.
(Continued)

*Primary Examiner* — Jun Li
(74) *Attorney, Agent, or Firm* — Shell USA, Inc.

(57) ABSTRACT

An ultra-stable catalyst composition for hydroprocessing hydrocarbon feedstocks and a method of making and use of the ultra-stable catalyst composition. The catalyst composition of the invention comprises a calcined mixture made by calcining a formed particle of a mixture comprising an inorganic oxide material, molybdenum trioxide, and a nickel compound; wherein the calcined mixture is further overlaid with a cobalt component and a molybdenum component to thereby provide the catalyst composition.

14 Claims, 1 Drawing Sheet

Related U.S. Application Data

(60) Provisional application No. 61/892,036, filed on Oct. 17, 2013.

(56) References Cited

U.S. PATENT DOCUMENTS

| | | | |
|---|---|---|---|
| 4,443,558 A | | 4/1984 | Gibson |
| 4,444,905 A | | 4/1984 | Pessimisis |
| 4,888,316 A | | 12/1989 | Gardner et al. |
| 4,981,832 A | | 1/1991 | Tawara et al. |
| 5,006,496 A | | 4/1991 | Huizinga et al. |
| 5,089,453 A | * | 2/1992 | Wilson .................. B01J 21/063 |
| | | | 502/308 |
| 5,389,595 A | | 2/1995 | Simpson et al. |
| 5,827,421 A | | 10/1998 | Sherwood, Jr. |
| 6,015,485 A | | 1/2000 | Shukis et al. |
| 6,030,915 A | | 2/2000 | De Boer |
| 6,127,299 A | | 10/2000 | De Boer |
| 6,759,364 B2 | * | 7/2004 | Bhan ...................... C10G 45/08 |
| | | | 502/439 |
| 7,727,929 B2 | * | 6/2010 | Bhan ...................... C10G 45/36 |
| | | | 502/313 |
| 7,820,036 B2 | | 10/2010 | Bhan |
| 8,530,373 B2 | | 9/2013 | Bhan |
| 8,883,673 B2 | | 11/2014 | Bhan |
| 9,879,187 B2 | * | 1/2018 | Bhan ................... B01J 35/1061 |
| 10,603,656 B2 | * | 3/2020 | Bhan ..................... C10G 45/08 |
| 2008/0060977 A1 | * | 3/2008 | Bhan ....................... B01J 27/19 |
| | | | 208/243 |
| 2012/0298503 A1 | * | 11/2012 | Hammad ............... B01J 23/882 |
| | | | 427/454 |
| 2013/0306517 A1 | | 11/2013 | Kester et al. |

FOREIGN PATENT DOCUMENTS

| | | |
|---|---|---|
| GB | 2055602 A | 3/1981 |
| GB | 2118063 A | 10/1983 |
| WO | 0232570 A2 | 4/2002 |
| WO | 2005051539 A1 | 6/2005 |

OTHER PUBLICATIONS

Murray et al., "Use of Mercury Intrusion Data, Combined with Nitrogen Adsorption Measurements, as a Probe of Pore Network Connectivity", Langmuir, vol. 15, 1999, pp. 8155-8160.

Tsakiroglou et al., "Pore-structure Analysis by Using Nitrogen Sorption and Mercury Intrusion Data", AIChE Journal, vol. 50, Issue No. 2, pp. 489-510.

* cited by examiner

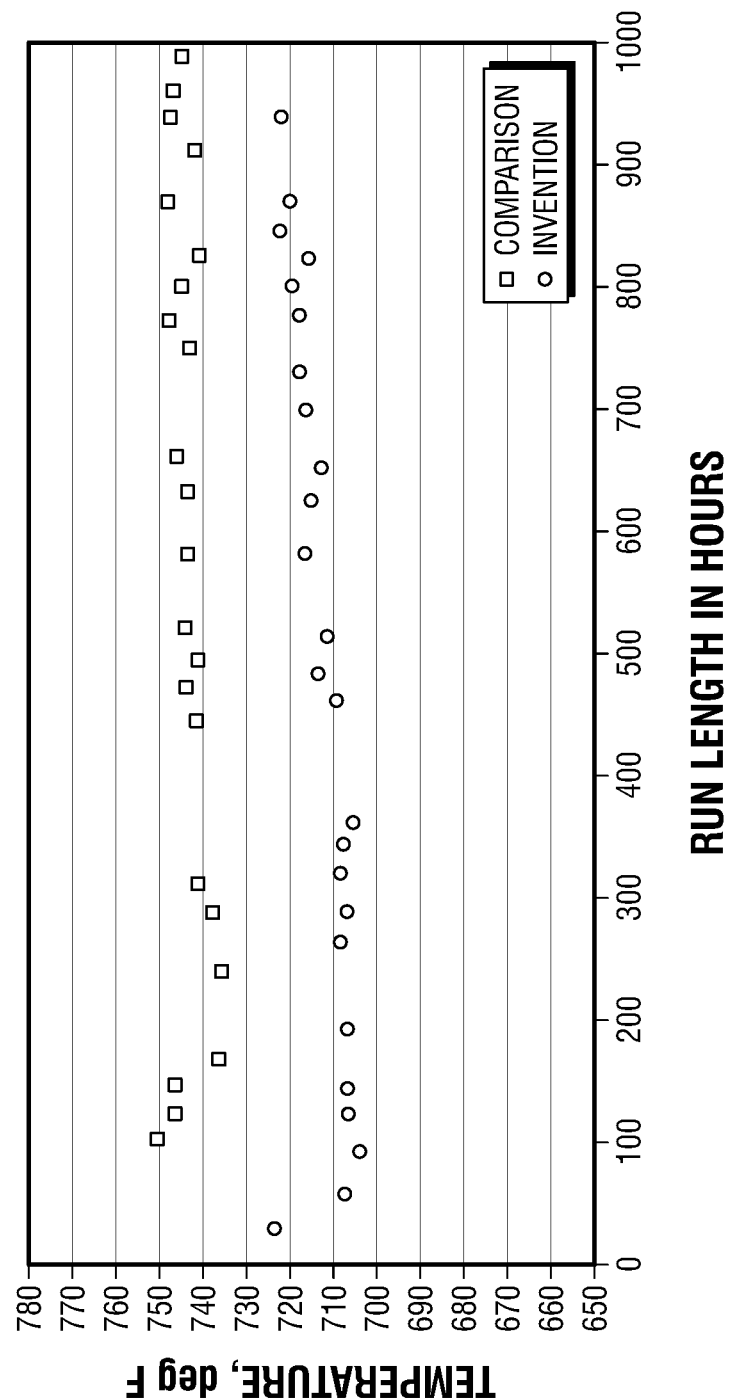

ULTRA-STABLE HEAVY HYDROCARBON HYDROPROCESSING CATALYST AND METHODS OF MAKING AND USE THEREOF

This application is a divisional of U.S. Non-provisional application of Ser. No. 14/514,814, filed Oct. 15, 2014, which claims the benefit of U.S. Provisional Application No. 61/892,036 filed Oct. 17, 2013, the disclosures of which are incorporated herein by reference.

This invention relates to an ultra-stable catalyst composition useful in the hydroprocessing of heavy hydrocarbon feedstocks, a method of making the hydroprocessing catalyst composition, and its use in the hydroprocessing of heavy hydrocarbon feedstocks.

The catalytic hydrotreatment of heavy hydrocarbon feedstocks to remove therefrom organic sulfur and nitrogen compounds is typically accomplished by contacting the heavy hydrocarbon feedstock with a catalyst under process conditions of elevated temperature and pressure and in the presence of hydrogen so as to convert the sulfur components of the feed to hydrogen sulfide and the nitrogen components of the feed to ammonia.

Typical hydroprocessing catalysts contain one or more hydrogenation metals and sometimes a promoter that are supported on a porous refractory oxide support. The hydrogenation metals can include those selected from Group VIII (e.g., cobalt and nickel) or from Group VIB (e.g., molybdenum and tungsten) of the Periodic Table of the Elements. The promoter component can include phosphorus. These catalysts may be prepared by impregnation of a formed particle of a porous refractory oxide material with a solution of the active components and with the resulting impregnated formed particle being calcined, or they may be prepared by co-mulling of the porous refractory oxide material with the active components followed by calcination of the co-mulled mixture. The catalyst may also be prepared by a combination of the co-mulling and impregnation steps.

One catalyst taught by the art as being useful in hydroprocessing of hydrocarbon oils is disclosed in U.S. Pat. No. 5,389,595 (Simpson et al.). This catalyst includes an underbedded Group VIII metal (e.g., cobalt and nickel) hydrogenation component and an overlayer of an additional catalytic promoter such as a Group VIB metal (e.g., molybdenum) or phosphorus, or a combination of both. The catalyst is prepared by calcining a refractory oxide particulate containing the Group VIII metal and then incorporating an additional catalytic component or promoter, such as a Group VIB metal and phosphorus, onto the calcined particle, which produces a catalyst having the underbedded Group VIII metal. The catalyst typically contains greater than 4.0, and preferably greater than 4.5 weight percent of a Group VIII metal component (calculated as the monoxide) and greater than 10, and preferably greater than 17 weight percent of a Group VIB metal component (calculated as the trioxide). The preferred catalyst has specifically defined porosity characteristics and is essentially free of supported metal components other than molybdenum and underbedded nickel. It is noted that it is preferred for the underbedded nickel of the catalyst to be provided by impregnating a support particle which is then calcined instead of co-mulling the nickel with a support material that is then formed into a particle which is calcined. There is no mention of an underbedded Group VIB metal component in the catalyst. U.S. Pat. No. 5,389,595 (Simpson et al.) is incorporated herein by reference.

Another catalyst disclosed in the art as useful in the desulfurization and denitrogenation of naphtha feeds while also simultaneously removing arsenic from such feeds is described in U.S. Pat. No. 6,759,364 (Bhan). This catalyst is prepared using three calcination steps and includes underbedded nickel or cobalt and a Group VIII metal overlayer on top of the nickel or cobalt that are contained in the finished calcined support. After the Group VIII metal is impregnated into the finished calcined support, the resulting impregnated support is then calcined in the second calcination step followed by a second impregnation step with a Group VIB metal and a third calcination step. The underbedded nickel or cobalt is present in the support at about 1 wt. %. The impregnated support contains at least 10 wt. % Group VIII metal, and the finished catalyst contains at least 8 wt. % of the Group VIB metal. The atomic ratio of Group VIII metal to Group VIB metal in the catalyst is between 1.5/1 and 2.5/1.

U.S. Pat. No. 7,727,929 (Bhan et al.) discloses a catalyst that is useful in arsenic removal from a monoolefin-containing hydrocarbon stream while selectively hydrogenating the diolefins in the stream. The catalyst includes a shaped agglomerate particle that contains a Group VIII metal that has been calcined and followed by overlaying a Group VIII metal onto the calcined shaped agglomerate particle which then undergoes as second calcination. The shaped agglomerated particle containing a Group VIII metal that is overlaid with a second Group VIII metal can further be overlaid with a Group VIB metal which then is subjected to a third calcination step. The Group VIII metal underlayer can be no greater than about 5 weight percent of the calcined shaped agglomerated particle. The Group VIII overlayer concentration in the catalyst composition is such that exceeds 6 weight percent of the catalyst composition. The catalyst composition may include a second metal overlay of Group VIB metal that is present at a concentration exceeding 8 weight percent of the catalyst composition. This second overlayer of Group VIB metal is incorporated into the shaped particle having incorporated therein a first overlayer of Group VIII metal and which has been calcined. The shaped particle with the Group VIB metal is also subsequently calcined. It is noted that the underbedded metal of the catalyst composition does not include a Group VIB metal and that the Group VIB metal is applied as a second metal overlayer of the catalyst. The first metal overlayer is a Group VIII metal. It is further noted that there is no underbedded phosphorus in the catalyst composition.

A catalyst that is useful in the hydroprocessing of heavy hydrocarbon feedstocks is taught in U.S. Pat. No. 7,820,036 (Bhan). This catalyst is a co-mulled mixture of molybdenum trioxide, a nickel compound, and an inorganic oxide material that is shaped and calcined. There is no mention of underbedding or overlayering of the hydrogenation metals of the catalyst.

The catalysts discussed above are reasonably useful for their indicated applications, but there is always a continuing effort to find new or improved catalyst compositions having increased catalytic activity or improved stability. In one application, it is desirable to have a hydroprocessing catalyst that is particularly useful in the hydroprocessing of vacuum gas oils under relatively low process pressure condition but which also has application in the hydroprocessing of heavier residue feedstocks. The use of cobalt as a hydrogenation catalytic component is thought to provide incremental catalytic activity benefits and provide for lower reaction pressure conditions. Due to the cost of cobalt as a component of a catalyst, however, it can be desirable to reduce the amount of cobalt that is required in the preparation of a useful hydroprocessing catalyst.

Accordingly, provided is an ultra-stable catalyst composition for hydroprocessing hydrocarbon feedstocks and a method of making and use of the ultra-stable catalyst composition. The catalyst composition of the invention comprises a calcined mixture made by calcining a formed particle of a mixture comprising an inorganic oxide material, molybdenum trioxide, and a nickel compound; wherein the calcined mixture is further overlaid with a cobalt component and a molybdenum component to thereby provide the catalyst composition.

The inventive catalyst composition is prepared by a method of making an ultra-stable catalyst, wherein the method comprises co-mulling an inorganic oxide material, molybdenum trioxide, and a nickel compound to thereby form a mixture; forming the mixture into a particle; calcining by a first calcination step the particle to thereby provide a calcined particle; incorporating an impregnation solution, comprising a cobalt component and a molybdenum component, into the calcined particle to thereby provide an impregnated particle; and calcining by a second calcination step the impregnated particle to thereby provide a calcined catalyst particle.

FIG. 1 is a graph showing the results from testing the inventive catalyst and a comparison catalyst in the hydrodesulfurization of a heavy residue feedstock with the reactor temperatures required to achieve an 89% conversion of the sulfur contained in a heavy residue feedstock using the respective catalyst indicated on the ordinate (y-axis) and the run length indicated on the abscissa (x-axis).

A novel catalyst composition has been discovered that has especially good catalytic activity in both the hydrotreating of vacuum gas oils in relatively low-pressure process units and the hydrotreating of residue feedstocks under process pressure conditions that are typical for such feedstocks. This catalyst composition is prepared by a novel method involving co-mulling an inorganic oxide material with a nickel component and a molybdenum component but with the exclusion of a material amount or the substantial absence of or an absence of cobalt as a component to thereby provide a mixture that is formed into a particle that is calcined to provide a calcined particle. These steps of the novel method are similar to those disclosed in U.S. Pat. No. 7,820,036. The '036 patent is incorporated herein by reference. The calcined particle that comprises an inorganic oxide material, molybdenum trioxide, and a nickel component is then impregnated with an impregnation solution of a cobalt component and a molybdenum component that are overlaid upon the molybdenum and nickel of the calcined particle. This impregnated particle is then calcined by a second calcination step to provide the final calcined mixture or calcined catalyst particle having both nickel and molybdenum as underbedded metal components and both cobalt and nickel as overlaid metal components.

A typical experience with hydroprocessing catalysts is that those containing more molybdenum tend to exhibit lower stability than catalysts containing less molybdenum. But it is an unexpected aspect of the inventive catalyst that in spite of the molybdenum concentration it is a very stable catalyst; and, because the presence of molybdenum in this particular catalyst does not seem to cause a significant reduction in catalyst stability, the addition of the molybdenum component allows for the use of less cobalt in the catalyst. The cobalt is a necessary component of the inventive catalyst due to it providing better catalyst activity at lower reaction pressure conditions than other catalytic metal components. Cobalt, however, is also a relatively more expensive metal than either nickel or even molybdenum, and, so there can be a benefit to backing cobalt out of the composition by the addition of molybdenum, which is used to offset some of the lost catalytic benefits provided by the cobalt.

A further important aspect of the inventive catalyst is that it contains no material or has a substantial absence of or an absence of a concentration of underbedded cobalt; and, rather, that the cobalt component of the catalyst be in the form of a cobalt overlayer on the underbedded molybdenum and nickel components, and, if present, the phosphorus component, of the catalyst.

In another embodiment of the inventive catalyst, the nickel content is substantially or completely in the form of underbedded nickel; and, thus, the catalyst contains no material or has a substantial absence of or an absence of a concentration of nickel that is in the form of a nickel overlayer. Thus, the step of impregnating the calcined particle of the invention does not include the incorporation of any significant or material amount of nickel into the calcined particle.

In yet another embodiment of the inventive catalyst, it can be important that the molybdenum content of the catalyst is in the form of both underbedded molybdenum and an overlayer of molybdenum.

It can also be a feature of the inventive catalyst for it to further comprise a phosphorus component. This phosphorus component can be in the form either as underbedded phosphorus or as an overlayer of phosphorus, but, a preferred embodiment of the inventive catalyst is that it contains phosphorus both in the form of underbedded phosphorus and as an overlayer of phosphorus.

While there is no certain theory regarding the mechanism explaining why the inventive catalyst exhibits particularly good catalytic properties, it is believed, however, that the particular combination of features of the catalyst, some of which features are noted above, is what contributes to its unique and unexpected properties.

In the method for preparing the inventive catalyst two calcination steps are used. The particle subjected to the first calcination step is prepared by combining the starting materials of the catalyst to form a mixture. These starting materials include an inorganic oxide material, a molybdenum source, and a nickel source.

In certain embodiments of the invention a phosphorus source may also be included in the preparation of the mixture.

It is believed that the form of the molybdenum source contributes in some manner to the enhanced properties of the inventive catalyst and that it is important for the molybdenum source that is mixed with the other starting materials of the mixture to be in the form of molybdenum trioxide as opposed to, for example, a molybdenum salt compound. It is further desirable for the molybdenum trioxide to be in the form of finely divided particles that may be as a dry powder or as particles in a suspension or slurry.

The inorganic oxide material is generally in the form of a powder and is selected from the group consisting of alumina, silica, and alumina-silica.

The nickel source may be selected from any suitable source of nickel including nickel salt compounds, both dry and dissolved in solution, nickel oxide, or any other suitable nickel source. Examples of a suitable nickel sources include the salt compound, nickel nitrate, and nickel oxide.

The mixture is formed by any suitable method or means known to those skilled in the art, including, but not limited to, the use of such various solids-mixing machines as tumblers, stationary shells or troughs, muller mixers, which are either batch type of continuous type, and impact mixers, and the use of such suitable types of either batch-wise or continuous mixers for mixing solids or liquids or for the formation of paste-like mixtures that are extrudable.

Suitable types of batch mixtures include, but are not limited to, change-can mixers, stationary-tank mixers, double-arm kneading mixers that are equipped with any suitable type of mixing blade.

Suitable types of continuous mixers include, but are not limited to, single or double screw extruders, trough-and-screw mixers and pug mills.

The mixing of starting materials of the catalyst may be conducted during any suitable time period necessary to properly homogenize the mixture. Generally, the blending time may be in the range of upwardly to 2 or more than 3 hours. Typically, the blending time is in the range of from 0.1 hours to 3 hours.

The term "co-mulling" is used broadly in this specification to mean that at least the recited starting materials are mixed together to form a mixture of the individual components of the mixture that is preferably a substantially uniform or homogeneous mixture of the individual components of such mixture. This term is intended to be broad enough in scope to include the mixing of the starting materials so as to yield a paste that exhibits properties making it capable of being extruded or formed into extrudate particles by any of the known extrusion methods. But, also, the term is intended to encompass the mixing of the starting materials so as to yield a mixture that is preferably substantially homogeneous and capable of being agglomerated into formed particles, such as, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

Once the starting materials of the catalyst are properly mixed and formed into the shaped or formed particles, a drying step may advantageously be used for removing certain quantities of water or volatiles that are included within the mixture or formed particles.

The drying of the formed particles may be conducted at any suitable temperature for removing excess water or volatiles, but, preferably, the drying temperature will be in the range of from about 75° C. to 250° C. The time period for drying the particles is any suitable period of time necessary to provide for the desired amount of reduction in the volatile content of the particles prior to the calcination step.

The dried or undried particles are calcined in the presence of an oxygen-containing fluid, such as air, at a temperature that is suitable for achieving a desired degree of calcination. Generally, the calcination temperature is in the range of from 450° C. (842° F.) to 760° C. (1400° F.). The temperature conditions at which the particles are calcined can be important to the control of the pore structure of the final calcined mixture.

Due to the presence of the molybdenum trioxide in the formed particles, the calcination temperature required to provide for a calcined mixture having the required pore structure is higher than typical temperatures required to calcine other compositions containing inorganic oxide materials, especially those that do not contain molybdenum trioxide. But, in any event, the temperature at which the formed particles are calcined to provide the finally calcined mixture is controlled so as to provide the finally calcined mixture having the pore structure properties as described in detail herein. The preferred calcination temperature is in the range of from 510° C. (950° F.) to 730° C. (1346° F.), and, most preferably, from 540° C. (1004° F.) to 705° C. (1301° F.).

The amount of molybdenum that is co-mulled into the mixture should be such as to provide in the calcined particle a molybdenum content in the range of from 2 weight percent (wt. %) to about 10 wt. % of the total weight of the calcined particle, with the weight percent being based on the molybdenum as an oxide. The calcined particle is the co-mulled mixture that has been agglomerated or formed into a particle, e.g., extruded to form an extrudate, and that is calcined to provide a calcined particle as are described above. It is desirable for the molybdenum content of the calcined particle to have from 3 wt. % to 9 wt. % molybdenum; but it is more desirable for the molybdenum content to be from 4 wt. % to 8 wt. % of the calcined particle. It is understood that a significant, if not major, portion of the total molybdenum content of the final calcined catalyst particle is present as an overlayer of molybdenum in addition to the underbedded molybdenum.

The amount of nickel that is in the co-mulled mixture should be such as to provide in the calcined particle a nickel content in the range of from or about 0.5 wt. % to or about 4 wt. % of the total weight of the calcined particle, with the weight percent being based on the nickel as an oxide. However, it is desirable for the nickel content of the calcined particle to be in the range of from 1 wt. % to 3 wt. %, and, it is more desirable for the nickel content to be in the range of from 1.5 wt. % to 2.5 wt. % of the calcined particle. It is an embodiment of the inventive catalyst for substantially all its nickel content to be in the form of underbedded nickel and for there to be no material amount of or a substantial absence of or an absence of overlaid nickel content in the final calcined catalyst particle.

For the embodiments of the inventive catalyst which have a concentration of phosphorus, the phosphorus may be present in the form of an underbedded phosphorus component or as an overlayer of the phosphorus component or as a combination of both underbedded phosphorus and an overlayer of phosphorus. The phosphorus should be present in the calcined catalyst particle in an amount in the range of from 0.5 wt. % to 4 wt. %, assuming the phosphorus is an oxide. It is preferred for the phosphorus content of the calcined catalyst particle to be in the range of from 0.75 wt. % to 3.5 wt. %, and, more preferably, from 1 wt. % to 3 wt. %. If a portion of the phosphorus is in the form of underbedded phosphorus, it is desirable for the phosphorus content of the calcined particle to be in the range of from 0.05 wt. % to 2 wt. %, more preferably, from 0.1 wt. % to 1.5 wt. %, and, most preferably, from 0.2 wt. % to 1 wt. %.

The impregnation solution used to incorporate the overlayer of cobalt, molybdenum, and phosphorus, if present, into the calcined particle so as to provide the impregnated particle is prepared by mixing together and dissolving a cobalt source, a molybdenum source, and a phosphorus source in water. Slight heating of the mixture may be applied as required to help in dissolving the components, and, if necessary, a suitable acid may be used to assist in the dissolution of the components and to provide as is required for the impregnation solution having a pH as is necessary. Typically, a suitable acid can include a mineral acid such as nitric acid.

Molybdenum compounds that may suitably be used in the preparation of the impregnation solution include, but are limited to, molybdenum trioxide and ammonium molybdate. Molybdenum trioxide is the preferred molybdenum compound used in the preparation of the impregnation solution.

The molybdenum concentration in the impregnation solution that is incorporated into the calcined particle should be such as to provide for the final calcined catalyst particle having a molybdenum content in the range of from 8 weight percent to 18 weight percent (wt. % calculated as $MoO_3$), with the weight percent being based on the total weight of the calcined catalyst particle. However, it is desirable for the amount of molybdenum that is contained in the impregnation solution to be such as to provide a calcined catalyst particle having a molybdenum content in the range of from 9 wt. % to 17 wt. %, but, preferably, from 10 to 16 wt. %.

Cobalt compounds suitable for use in the preparation of the impregnation solution include, but are not limited to, cobalt hydroxides, cobalt nitrates, cobalt acetates, and cobalt oxides. Cobalt oxide and cobalt nitrate are the preferred cobalt compounds with cobalt oxide being the most preferred.

The amount of cobalt contained in the impregnation solution should be such as to provide for a final calcined catalyst particle having a cobalt content in the range of from 0.5 to 6 weight percent (wt % calculated as CoO), with the weight percent being based on the total weight of the calcined catalyst particle. However, it is desirable for the amount of the cobalt compound that is contained in the impregnation solution to be such as to provide for the calcined catalyst particle having cobalt content in the range of from 0.75 to 5 wt. %, but, preferably, from 1 to 4 wt. % and, most preferably, from 1.25 to 3.5 wt. % (calculated as CoO).

The phosphorus compound used in the preparation of the impregnation solution typically is in the form of a phosphorus-containing solution that is prepared using a salt compound of phosphorus or an oxyacid of phosphorus. Suitable salt compounds include, but are not limited, to phosphate compounds with a cation such as sodium, potassium, rubidium, cesium, or ammonium, or any of the aqueous forms of phosphate (e.g. phosphate ion ($PO_4^{-3}$), hydrogen phosphate ion ($HPO_4^{-2}$), dihydrogen phosphate ion ($H_2PO^{-4}$) and trihydrogen phosphate ($H_3PO_4$)). Suitable oxyacids of phosphorus include but are not limited to phosphorus acid ($H_3PO_3$), phosphoric acid ($H_3PO_4$), hydrophosphorus acid ($H_3PO_2$).

The amount of phosphorus contained in the impregnation solution is such as to provide a calcined catalyst particle having a phosphorus content in the range of from 0.5 wt. % to 4 wt. % phosphorus, based on the total weight of the calcined catalyst particle calculated assuming the phosphorus is in the form of phosphorus pentoxide ($P_2O_5$). Preferably, the concentration of phosphorus pentoxide in the calcined particle is in the range of from 0.75 wt. % to 3.75 wt. %, and, most preferably, the concentration is in the range of from 1 wt. % to 3.5 wt. %.

The overlayer metals are preferably incorporated into the calcined particle by any impregnation procedure or method that suitably provides for the metal overlayer of cobalt and molybdenum and, if applied, phosphorus, at the concentrations as presented above and to provide the impregnated particle. Suitable impregnation procedures include, for example, spray impregnation, soaking, multi-dip procedures, and incipient wetness impregnation methods.

The impregnated particle is then dried to remove a portion of the free water or other volatiles from the impregnated particle. The drying temperature is typically in the range of from 75° C. to 250° C. The time period for drying the impregnated particle is any suitable period of time necessary to provide for the desired amount of reduction in the volatile content of the particles prior to the calcinations of the impregnated particle.

The impregnated particle, which may or may not have been dried, is calcined in the presence of an oxygen-containing fluid, such as air. The temperature at which the impregnated particle is calcined generally in the range of from 371° C. (700° F.) to about 760° C. (1400° F.). Preferably, the calcination temperature is the range of from 482° C. (900° F.) to about 732° C. (1350° F.), and, more preferably, it is from 510° C. (950° F.) to 704° C. (1300° F.). The time for conducting the calcinations is that which is required to remove the volatile matter and convert the metal compounds in the impregnated particle substantially into the metal oxide form. The time required for the calcination is generally in the range of from about 0.5 hours to about 4 hours.

The catalyst composition of the invention may be employed as a part of any suitable reactor system that provides for contacting it or a derivative thereof with a hydrocarbon feedstock under suitable hydroprocessing conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the hydrocarbon feedstock into the reactor vessel, and a reactor effluent outlet means, such as an effluent outlet nozzle, for withdrawing the reactor effluent or the treated hydrocarbon product from the reactor vessel.

The hydrocarbon feedstock contemplated for contacting with the catalyst composition of the invention is a mixture of normally liquid hydrocarbons, i.e., compounds containing combinations of hydrogen and carbon atoms, which are typically derived from petroleum oils or synthetic crudes. Among the typical feedstocks contemplated for processing with the inventive catalyst composition are topped crudes, vacuum and atmospheric residual fractions, light and heavy atmospheric distillate oils, light and heavy vacuum gas oils, shale oils, and oils from bituminous sands and coal compositions and the like. The hydrocarbon feedstock can include contaminating components such as organometallic, organonitrogen, and organosulfur compounds.

The heavy hydrocarbon feedstock of the inventive process may be derived from any of the high boiling temperature petroleum cuts such as the atmospheric tower gas oils, atmospheric tower bottoms, vacuum tower gas oils, and vacuum tower bottoms or resid. The heavy hydrocarbon feedstock generally can comprise hydrocarbons having a boiling temperature in the range of from about 250° C. (482° F.) to about 650° C. (1202° F.).

The heavy hydrocarbon feedstock can have a more narrowly defined boiling temperature wherein its 5% distillation point, i.e., T(5), that exceeds 300° C. (572° F.) as determined by using the testing procedure set forth in ASTM D-1160. The invention is more particularly directed to the hydroprocessing of a heavy hydrocarbon feedstock having a T(5) that exceeds 310° C. (590° F.) or a feedstock having a T(5) that exceeds 315° C. (599° F.) or even exceeding 340° C. (644° F.). In the processing of certain vacuum gas oils it can sometimes be desirable for the T(95) of the feedstock to be below 545° C. (1013° F.) or below 540° C. (1004° F.) or even below 530° C. (986° F.).

The vacuum resid feedstock of the inventive process will have a significant portion comprising heavier hydrocarbons boiling at temperatures above 538° C. (1000° F.). These vacuum resids can have as little as 10 volume percent of the heavier hydrocarbons or as much as 90 volume percent of the heavier hydrocarbons, but, generally, the amount of the heavier hydrocarbons boiling above 538° C. is in the range of from 20 to 80 volume percent, or in the range of from 30 to 75 volume percent.

The hydroprocessing process generally operates at a hydroprocessing reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

A feature of the invention is that it provides for the desulfurization of the heavy feedstock that has a significantly high sulfur content, such as a sulfur content of at least or greater than 0.5 weight percent, so as to provide for a treated hydrocarbon product having a reduced sulfur content, such as a sulfur content of less than 0.5 weight percent.

When referring herein to the sulfur content of either the heavy hydrocarbon feedstock or the treated hydrocarbon product, the weight percents are determined by the use of testing method ASTM D-4294.

The inventive process is particularly useful in the processing of a heavy hydrocarbon feedstock that has a sulfur content exceeding 0.75 weight percent, and with such a heavy hydrocarbon feedstock, the sulfur content may be in the range of from 0.75 to 8 weight percent. The inventive catalyst and process is especially useful in the processing of a heavy hydrocarbon feedstock having an especially high sulfur content of exceeding 1 or even 2 weight percent and being in the range of from 1 to 7 weight percent or even from 2 to 6.5 weight percent.

The inventive process utilizes the inventive catalyst in the hydroprocessing of the heavy hydrocarbon feedstock to provide for the hydrotreating, which includes desulfurization, to yield the treated hydrocarbon product having reduced sulfur and other contaminants. In this process, the heavy hydrocarbon feedstock is contacted with the inventive catalyst under suitable hydrotreating process conditions and the treated hydrocarbon product is yielded. The treated hydrocarbon product should have a reduced sulfur content that is below that of the heavy hydrocarbon feedstock, such as a sulfur content of less than 0.5 weight percent. It is preferred for the reduced sulfur content of the treated hydrocarbon product to be less than 0.4 weight percent, and, most preferably, less than 0.3 weight percent. It is recognized that the inventive process, however, may have the capability of effectively desulfurizing the heavy hydrocarbon feedstock to provide the treated hydrocarbon product having a reduced sulfur content of less than 0.25 and even less than 0.2 weight percent.

The inventive process generally operates at a hydroprocessing (hydrodesulfurization) reaction pressure in the range of from 2298 kPa (300 psig) to 20,684 kPa (3000 psig), preferably from 10,342 kPa (1500 psig) to 17,237 kPa (2500 psig), and, more preferably, from 12,411 kPa (1800 psig) to 15,513 kPa (2250 psig).

The hydroprocessing reaction temperature is generally in the range of from 340° C. (644° F.) to 480° C. (896° F.), preferably, from 360° C. (680° F.) to 455° C. (851° F.), and, most preferably, from 380° C. (716° F.) to 425° C. (797° F.).

The flow rate at which the heavy hydrocarbon feedstock is charged to the reaction zone of the inventive process is generally such as to provide a liquid hourly space velocity (LHSV) in the range of from 0.01 hr$^{-1}$ to 3 hr$^{-1}$. The term "liquid hourly space velocity", as used herein, means the numerical ratio of the rate at which the heavy hydrocarbon feedstock is charged to the reaction zone of the inventive process in volume per hour divided by the volume of catalyst contained in the reaction zone to which the heavy hydrocarbon feedstock is charged. The preferred LHSV is in the range of from 0.05 hr$^{-1}$ to 2 hr$^{-1}$, more preferably, from 0.1 hr$^{-1}$ to 1.5 hr$^{-1}$ and, most preferably, from 0.2 hr$^{-1}$ to 0.7 hr$^{-1}$.

It is preferred to charge hydrogen along with the heavy hydrocarbon feedstock to the reaction zone of the inventive process. In this instance, the hydrogen is sometime referred to as hydrogen treat gas. The hydrogen treat gas rate is the amount of hydrogen relative to the amount of heavy hydrocarbon feedstock charged to the reaction zone and generally is in the range upwardly to 1781 m$^3$/m$^3$ (10,000 SCF/bbl). It is preferred for the treat gas rate to be in the range of from 89 m$^3$/m$^3$ (500 SCF/bbl) to 1781 m$^3$/m$^3$ (10,000 SCF/bbl), more preferably, from 178 m$^3$/m$^3$ (1,000 SCF/bbl) to 1602 m$^3$/m$^3$ (9,000 SCF/bbl), and, most preferably, from 356 m$^3$/m$^3$ (2,000 SCF/bbl) to 1425 m$^3$/m$^3$ (8,000 SCF/bbl).

The following examples are presented to illustrate certain aspects of the invention, but they are not to be construed as limiting the scope of the invention.

EXAMPLE 1

This Example 1 describes the preparation and composition of one exemplary catalyst composition according to the invention.

Catalyst A

Catalyst A was prepared by first combining 2400 parts by weight alumina, 291.61 parts by weight nickel nitrate (Ni(NO$_3$)$_2$) dissolved in 100.85 parts by weight deionized water, and 900 parts by weight crushed Ni/Mo/P hydrotreating catalyst and 284.5 parts of MoO$_3$ within a Muller mixer along with 130 parts by weight 69.9% concentrated nitric acid and 30 grams of a commercial extrusion aid. A total of 2840.63 parts by weight of water was added to these components during the mixing. The components were mixed for approximately 45 minutes. The mixture had a pH of 4.23 and an LOI of 55.46 weight percent. The mixture was then extruded using 1.3 mm trilobe dies to form 1.3 trilobe extrudate particles. The extrudate particles were then dried in air for a period of several hours at a temperature of 100° C.

Aliquot portions of the dried extrudate particles were calcined in air each for a period of two hours at a temperature of 766° C. (1410° F.). The final calcined mixture contained 2.2 weight percent nickel metal (2.8 wt. % as NiO), and 7.9% molybdenum metal (11.9 wt. % as MoO$_3$) and 83.6 weight percent of alumina containing and 1.1% of phosphorus pentaoxide.

The following Table 1 presents certain properties of the calcined extrudate. As may be seen from the pore properties presented in Table 1, the percentage of the total pore volume contained in the micropores having a pore diameter of greater than 1000 Angstroms is less than 5% percent and a pore diameter of from 100-150 A is at least 40%.

TABLE 1

Properties of Calcined Catalyst A

| Properties | |
|---|---|
| MoO$_3$ | 11.85 |
| NiO | 2.75 |
| Hg Pore Size Dist. (Angs) | |
| <70 | 5.1% |
| 70-350 | 92.3% |
| >350 | 2.6% |
| >1000 | 0.2% |
| >5000 | 0% |
| Total Pore Volume, cc/g | 0.60% |
| Medium Pore Diameter, Å | 90% |

Catalyst B

An impregration solution was prepared by first combining 6.98 parts of 85.8% phosphoric acid and 16.5 parts of MoO$_3$ in 92 ml of DI water and heated the solution to 82° C. Added 4.52 parts of Co(OH)$_2$ slowly to control exotherm and heated the mixture to 100° C. Added 4.37 parts of citric acid. Cooked for 30 minutes to clear. Adjusted volume based on final catalyst pore volume—solution pH was 2.64.

Impregnated 100 parts of Catalyst A with the final solution. Aged impregnated catalyst for two hours at room temperature with occasional shaking. Dried the impregnated catalyst for two hours at 135° C. and calcined in air for a period of two hours at a temperature of 482° C. (900° F.). The final calcined mixture contained 1.9 weight percent nickel metal (2.4 wt. % as NiO), 2.3 weight percent of cobalt (2.9 wt % as CoO) and 14.1 weight percent molybdenum metal (21.1 wt. % as MoO$_3$) and 69.3 weight percent of alumina and 4.27% of phosphorus pentaoxide.

The following Table 1 presents certain properties of the calcined extrudate. As may be seen from the pore properties presented in Table 1, the percentage of the total pore volume contained in the micropores having a pore diameter of greater than 1000 Angstroms was higher than 10% percent.

TABLE 2

Properties of Calcined Catalyst B

| Properties | Calcination Temperature 482° C. (900° F.) |
|---|---|
| MoO$_3$ | 21.1 |
| NiO | 2.4 |
| CoO | 2.9 |
| <70 | 2.8% |
| 70-350 | 2.3% |
| >350 | 2.3% |
| >1000 | 0.2 |
| >5000 | 0 |
| Total Pore Volume, cc/g | 0.45 |
| Medium Pore Diameter, Å | 99 |

EXAMPLE 2

This Example 2 describes one of the methods used in testing the catalysts described in Example 1. This method provided for the processing of a feedstock having a significant sulfur concentration to yield a product having specified sulfur concentration. The reactor temperature was operated at a temperature of 700° F.

16.7 cc/7.83 g of a commercial HDM catalyst obtained from Criterion Catalyst company (RM-5030 1.3 TL) was first intimately mixed with 16.7 cc of silicon carbide of 20 mesh size. Separately, 33.7 cc/26.1 g of Catalyst A were mixed with 33.7 cc of silicon carbide of 20 mesh size. 130 g of 20 mesh silicon carbide was placed into a 1.5875 cm (⅝ inch) ID by 127 cm (50 inch) stainless steel tube reactor, with the catalyst. The tube reactor was equipped with thermocouples placed in a 0.635 cm (¼ inch) thermo-well inserted concentrically into the catalyst bed, and the reactor tube was held within a 132 cm (52 inch) long 5-zone furnace with each of the zones being separately controlled based on a signal from a thermocouple.

The first mixture of commercial HDM catalyst and silicon carbide was poured into reactor with gentle tapping, followed by Catalyst A and silicon carbide mixture. The reactor was tapped several times and a plug of glass wool inserted followed by 130 g of Sic and another glass plug.

The catalyst bed was activated by feeding at ambient pressure a gas mixture of 5 vol. % H2S and 95 vol. % H$_2$ to the reactor at a rate of 1.5 LHSV while incrementally increasing the reactor temperature at a rate of 100° F./hr up to 400° F. The catalyst bed was maintained at a temperature of 400° F. for two hours and then the temperature was incrementally increased at a rate of 100° F./hr to a temperature of 600° F., where it was held for one hour followed again by an incremental increase in the temperature at a rate of 75° F./hr up to a temperature of 700° F., where it was held for two hours before cooling the catalyst bed temperature down to the ambient temperature. The catalyst bed was then pressured with pure hydrogen at 1000 psig, and the temperature of the catalyst bed was incrementally increased at a rate of 100° F./hr to 400° F. The reactor was then charged with feedstock while the temperature of the reactor was held at 400° F. for one hour. The catalyst bed temperature was then incrementally increased at a rate of 50° F./hr up 700° F., from which point the run was started. Catalyst B was also loaded and sulfided similarly.

The feedstock charged to the reactor was a Middle Eastern origin long residue. The distillation properties of the feedstock as determined by ASTM Method D7169 are presented in Table 2. Table 3 presents certain other properties of the feedstock.

TABLE 2

Distillation of Feedstock

| | Temp. ° F. | Wt. % |
|---|---|---|
| IBP | 522.0 | |
| | 721.0 | 10.0 |
| | 806.0 | 20.0 |
| | 871.0 | 30.0 |
| | 932.0 | 40.0 |
| | 999.0 | 50.0 |
| | 1074.0 | 60.0 |
| | 1159.0 | 70.0 |
| | 1260.0 | 80.0 |
| | 0.0 | 90.0 |
| FBP | 1351.0 | |

TABLE 3

Other properties of the feedstock

| H (wt %) | 11.010 |
|---|---|
| C (wt %) | 84.070 |
| O (wt %) | 0.085 |

TABLE 3-continued

| Other properties of the feedstock | |
|---|---|
| N (wt %) | 0.260 |
| S (wt %) | 4.575 |
| MCR | 12.10 |
| 1000F+ | 49.10 |
| C7 asph | 5.50 |
| Density 60° F. | 0.9819 |
| Ni (ppm) | 20.6 |
| V (ppm) | 70.0 |
| M (ppm) | 90.6 |
| BN (ppm) | 734 |
| P-Value | 2.80 |
| Viscosity | 6067.0 |
| C5-asph | 12.10 |

The feedstock was charged to the reactor along with hydrogen gas. The reactor was maintained at a pressure of 1900 psig and the feedstock was charged to the reactor at a rate so as to provide a liquid hourly space velocity (LHSV) of 1.00 hr-1 and the hydrogen was charged at a rate of 4,000 SCF/bbl. The temperature of the reactor was set at 371° C. (700° F.).

This method provided for the processing of a feedstock having significant sulfur and pitch contents to yield a product having reduced sulfur and pitch contents and product liquid that is stable. The reactor temperature was kept constant in conducting these reactions and the sulfur content, the pitch content and the product liquid quality were monitored.

Presented in FIG. 1 are plots temperature required to achieve 89% removal of sulfur from feed (0.50 wt. %) sulfur in product liquid (the estimated linear using product sulfur content, $2^{nd}$ order reaction rate constant and an activation energy for sulfur removal of 33.4 Kcal/mol).

As may be seen from the FIG. 1, the HDS activity of the inventive catalyst is significantly better than that of the comparison catalyst in that the reactor temperature required to achieve the 89% conversion of sulfur with the use of the inventive catalyst is as much as 20-30° F. lower than with the use of the comparison catalyst. Also, it is further unexpected that the stability of the inventive catalyst, which is indicated by the rate of decline in the HDS activity of the catalyst, is comparable to that of the comparison catalyst. This is in spite of the of molybdenum content in the inventive catalyst.

What is claimed is:

1. A catalyst comprising:
   (a) a calcined particle comprising an inorganic oxide material and underbedded metals, wherein the underbedded metals comprise molybdenum and nickel; and
   (b) an overlayer on top of the calcined particle, the overlayer comprising cobalt and molybdenum, and absent a nickel concentration in the form of a nickel overlayer.

2. The catalyst according to claim 1, wherein the calcined particle further comprises a phosphorus compound.

3. The catalyst according to claim 1,
   wherein the catalyst has a phosphorous content ranging from 0.5 wt. % to 4 wt. %, by weight of the calcined catalyst particle, and
   wherein the calcined particle has a phosphorous content ranging from 0.05 wt. % to 2 wt. %, by weight of the calcined particle.

4. The catalyst according to claim 3, wherein the overlayer further comprises a phosphorus component.

5. The catalyst according to claim 4, wherein the catalyst has a phosphorous content ranging from 1 wt. % to 3 wt. %, and wherein the calcined particle has a phosphorous content ranging from 0.2 wt. % to 1 wt. %.

6. The catalyst according to claim 1, wherein a molybdenum content of the calcined particle is in the range of from 2 wt. % to 10 wt. % of the total weight of the calcined particle, and a nickel content of the calcined particle is in the range of from about 0.5 wt. % to about 4 wt. % of the total weight of said calcined particle.

7. The catalyst according to claim 6,
   wherein the molybdenum content of the catalyst is in the range of from 8 wt. % to 18 wt. % of the total weight of the catalyst, and
   wherein the cobalt content of the catalyst is in the range of from 0.5 to 6 wt. % of the total weight of the catalyst.

8. The catalyst according to claim 7, wherein the catalyst has an absence of a concentration of underbedded cobalt.

9. The catalyst according to claim 8, wherein the catalyst has an absence of a concentration of nickel that is in the form of a nickel overlayer.

10. The catalyst according to claim 1, wherein the calcined particle is made by calcining a particle formed of a mixture comprising an inorganic oxide, a molybdenum trioxide, and a nickel compound.

11. The catalyst according to claim 10, wherein the mixture further comprises phosphorus as both underbedded phosphorus and an overlayer of phosphorus.

12. The catalyst according to claim 11,
   wherein the catalyst has a phosphorous content ranging from 0.5 wt. % to 4 wt. %, by weight of the calcined catalyst particle, and
   wherein the calcined particle has a phosphorous content ranging from 0.05 wt. % to 2 wt. %, by weight of the calcined particle.

13. The catalyst according to claim 1, wherein less than 5% of a total pore volume of the catalyst has a pore diameter of greater than 1,000 angstroms.

14. The catalyst according to claim 1, wherein at least 40% of a total pore volume of the catalyst has a pore in the range of from 100 angstroms to 150 angstroms.

* * * * *